(12) United States Patent
Lambert

(10) Patent No.: US 9,398,455 B2
(45) Date of Patent: Jul. 19, 2016

(54) SYSTEM AND METHOD FOR GENERATING AN IDENTIFICATION BASED ON A PUBLIC KEY OF AN ASYMMETRIC KEY PAIR

(71) Applicant: Marvell World Trade Ltd., St. Michael (BB)

(72) Inventor: Paul A. Lambert, Mountain View, CA (US)

(73) Assignee: Marvell World Trade Ltd., St. Michael (BB)

(*) Notice: Subject to any disclaimer, the term of this patent is extended or adjusted under 35 U.S.C. 154(b) by 65 days.

(21) Appl. No.: 13/804,425

(22) Filed: Mar. 14, 2013

(65) Prior Publication Data

US 2013/0246792 A1 Sep. 19, 2013

Related U.S. Application Data

(60) Provisional application No. 61/610,902, filed on Mar. 14, 2012.

(51) Int. Cl.
| | |
|---|---|
| H04L 29/06 | (2006.01) |
| H04W 12/06 | (2009.01) |
| H04W 12/10 | (2009.01) |
| H04L 9/08 | (2006.01) |
| H04L 9/32 | (2006.01) |

(52) U.S. Cl.
CPC ............ *H04W 12/06* (2013.01); *H04L 9/0866* (2013.01); *H04W 12/10* (2013.01); *H04L 9/3236* (2013.01); *H04L 2209/80* (2013.01)

(58) Field of Classification Search
CPC ...... H04L 9/32; H04L 63/0442; H04L 9/3236
USPC ........................................................ 713/168
See application file for complete search history.

(56) References Cited

U.S. PATENT DOCUMENTS

| | | | |
|---|---|---|---|
| 6,058,188 A * | 5/2000 | Chandersekaran et al. | 380/286 |
| 8,166,309 B2 * | 4/2012 | Muralidharan et al. | 713/181 |

(Continued)

FOREIGN PATENT DOCUMENTS

GB 2407239 A * 4/2005 ............ H04L 9/3236

OTHER PUBLICATIONS

International Search Report and Written Opinion issued Nov. 6, 2013 in PCT/US2013/031545 filed on Mar. 14, 2013.

(Continued)

*Primary Examiner* — Hadi Armouche
*Assistant Examiner* — Bryan Wright

(57) ABSTRACT

Aspects of the disclosure provide a method. The method includes generating an identification based on a public key of an asymmetric key pair for a device, including the identification into an information unit to identify the device as a source of the information unit and transmitting the information unit.

14 Claims, 4 Drawing Sheets

(56) References Cited

U.S. PATENT DOCUMENTS

| | | | |
|---|---|---|---|
| 8,418,242 B2* | 4/2013 | Zhang | H04L 63/061 713/51 |
| 8,694,782 B2* | 4/2014 | Lambert | 713/168 |
| 2004/0158708 A1* | 8/2004 | Peyravian | H04L 9/0825 713/156 |
| 2004/0193875 A1* | 9/2004 | Aura | H04L 9/3236 713/162 |
| 2005/0015602 A1* | 1/2005 | Rees | 713/182 |
| 2006/0104243 A1 | 5/2006 | Park | |
| 2006/0253704 A1 | 11/2006 | Kempf et al. | |
| 2007/0022469 A1* | 1/2007 | Cooper et al. | 726/3 |
| 2007/0098178 A1* | 5/2007 | Raikar | 380/282 |
| 2009/0323972 A1* | 12/2009 | Kohno et al. | 380/284 |
| 2011/0039592 A1 | 2/2011 | Haddad et al. | |

OTHER PUBLICATIONS

I. Van Beijnum, "Crypto Based Host Identifiers", Internet Draft, draft-van-beijnum-multi6-cbhi-00.txt, ISSN: 0000-0004, XP15036389A, Jan. 1, 2004, pp. 1-7.

* cited by examiner

SYSTEM AND METHOD FOR GENERATING AN IDENTIFICATION BASED ON A PUBLIC KEY OF AN ASYMMETRIC KEY PAIR

INCORPORATION BY REFERENCE

This present disclosure claims the benefit of U.S. Provisional Application No. 61/610,902, "KEY CENTRIC IDENTITY" filed on Mar. 14, 2012, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In a wireless network, such as a wireless local area network (LAN), information is often transmitted via electromagnetic waves in the air. Because of the broadcast nature of the electromagnetic waves, the wireless network needs to apply security approaches, such as authentication, data privacy, and the like, to protect the wireless network and the information transmitted within the wireless network.

SUMMARY

Aspects of the disclosure provide a method. The method includes generating an identification based on a public key of an asymmetric key pair for a device, including the identification into an information unit to identify the device as a source of the information unit and transmitting the information unit.

To generate the identification based on the public key of the asymmetric key pair for the device, in an embodiment, the method includes truncating the public key to generate the identification. In another embodiment, the method includes hashing the public key to generate the identification. In an example, the method includes performing a hash function on the public key with a variable parameter to generate the identification. Further, the method includes varying a value of the parameter, and performing the hash function on the public key with the varied parameter to generate another identification.

To include the identification into the information unit as the source of the information unit, in an embodiment, the method includes including the identification into a media access control (MAC) frame to identify the device as the source of the MAC frame. In an example, the method includes including the identification into an address field in the MAC frame.

Additionally, in an example, the method includes generating another identification based on the public key for the device when a collision of the identification is detected.

Further, in an embodiment, to include the identification into the information unit to identify the device as the source of the information unit, the method includes including the identification as an address in a protocol. In an example, the method includes including a truncated version of the identification as the address, such as a 802.11 local address.

Aspects of the disclosure provide an apparatus that includes a storage medium, a processing circuit and a transmitting circuit. The storage medium is configured to store an asymmetric key pair. The processing circuit is configured to generate an identification based on a public key of the asymmetric key pair and include the identification into an information unit to identify the apparatus as a source of the information unit. The transmitting circuit is configured to transmit the information unit.

Aspects of the disclosure provide a method that includes receiving by a first device an information unit from a second device, processing the information unit to obtain an identification in a field of the information unit that is generated based on a public key of the second device, and identifying the second device based on the identification.

Aspects of the disclosure also provide an apparatus that includes a receiving circuit and a processing circuit. The receiving circuit is configured to receive an information unit from another apparatus. The processing circuit is configured to process the information unit to obtain an identification in a field of the information unit that is generated based on a public key of the other apparatus, and identify the other apparatus based on the identification.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
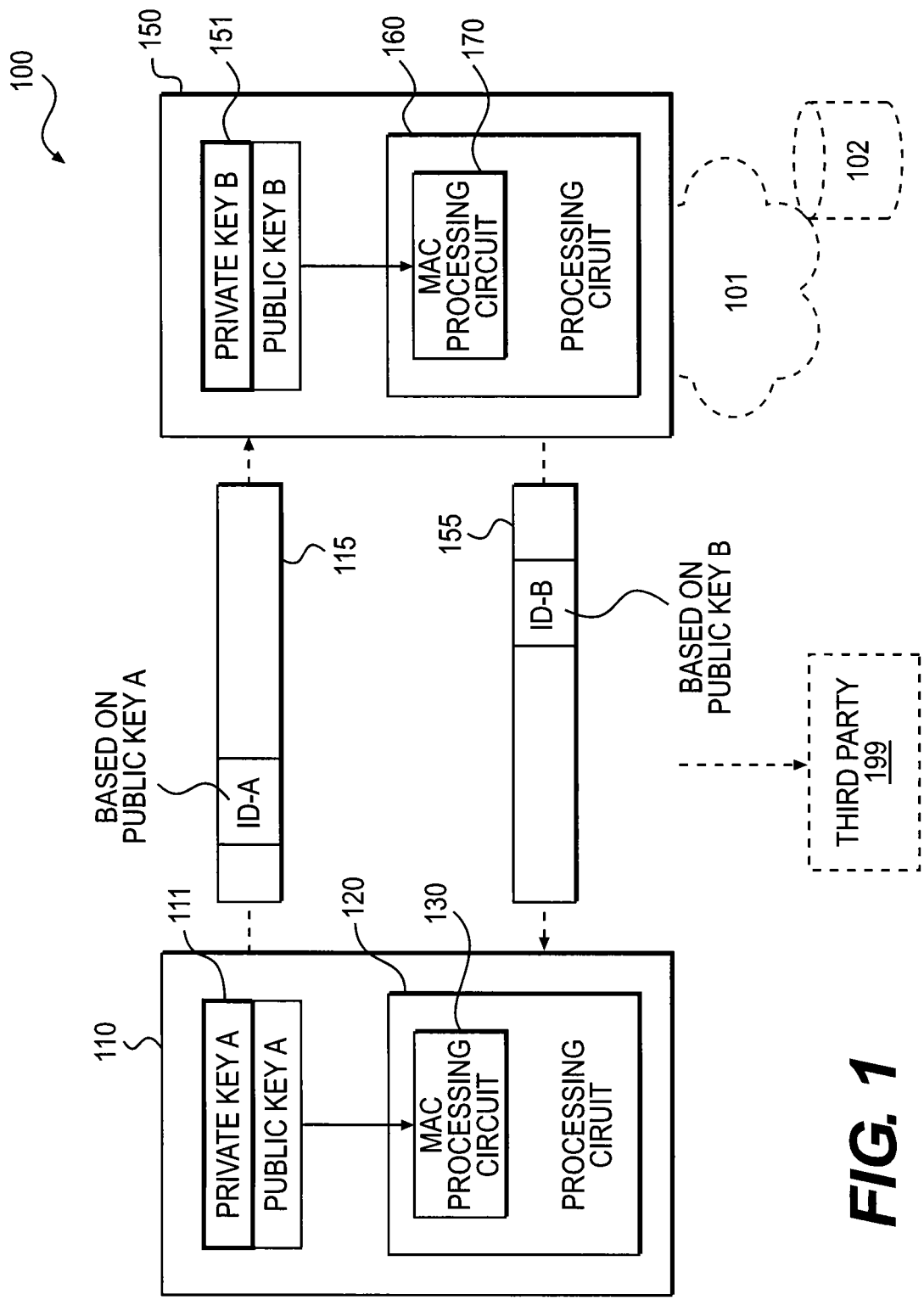
FIG. 1 shows a block diagram of a system example 100 according to an embodiment of the disclosure.

FIG. 1 shows a block diagram of a system example 100 according to an embodiment of the disclosure. The system 100 includes a first device 110 and a second device 150 in communication. The two devices 110 and 150 use public key based identifications to conduct the communication in a secure manner.

According to an aspect of the disclosure, the system 100 is a wireless communication system that the first device 110 and the second device 150 communicate via electromagnetic waves in the air. For example, the first device 110 and the second device 150 respectively include components, such as transmitting circuit (not shown), receiving circuit (not shown), antenna (not shown), and the like, that are configured to enable transmitting and receiving information carried by electromagnetic waves. The first device 110 and the second device 120 can be any suitable device, such as a desktop computer, a laptop computer, a hand-held computer, a personal digital assistant, a tablet computer, a cell phone, an access point, a camera, a printer, a router, a modem, a television, and the like. In an embodiment, the first device 110 and the second device 150 are wireless local area network (WLAN) products that are configured to comply with a suitable Institute of Electrical and Electronics Engineers (IEEE) 802.11 standard.

According to an aspect of the disclosure, the first device 110 and the second device 150 communicate directly and use public key based device-to-device authentication.

Specifically, in the FIG. 1 example, the first device 110 stores a pair of asymmetric keys 111, such as a public key A and a private key A, in a suitable storage medium. The private key A is stored in a protected manner that is only available to the first device 110. The public key A can be distributed publically. Similarly, the second device 150 stores a pair of asymmetric keys 151, such as a public key B and a private key B, in a suitable storage medium. The private key B is stored in a protected manner that is only available to the second device 150, and the public key B can be distributed publically.

Generally, asymmetric keys are used for asymmetric key cryptography (public key cryptography). The private and public keys in each asymmetric key pair are different but linked. One key is used to encrypt a plaintext into a ciphertext, and the other key can be used to decrypt the ciphertext back to the plaintext. For example, when the public key is used to encrypt a plaintext into a ciphertext, the private key can be used to decrypt the ciphertext back to the plaintext; and when the private key is used to encrypt a plaintext into a ciphertext, the public key can be used to decrypt the ciphertext back to the plaintext.

According to an aspect of the disclosure, the respective public keys for the first device 110 and the second device 150 are used to generate identifiers for identifying the first device 110 and the second device 150. In an example, each public key includes a relatively large number of bits, such as in the range of 120 to 160 binary bits, that are randomly or pseudo randomly generated, and thus a public key for a key holder is generally considered to be unique, and can be used for identification purpose.

According to an embodiment of the disclosure, the identification can be generated with a reduced number of bits compared to the public key to simplify processing. In an example, the public key is truncated to generate the identification. In another example, a hash algorithm, such as a secure hash algorithm (SHA), and the like, is used to generate the public key based identification.

It is noted that multiple identifications can be generated based on the same public key. In an example, a 160-bit public key is truncated into three identifications that each has 46 bits. In another example, a hash algorithm includes a variable parameter. When the value of the parameter changes, the hash algorithm generates different hashing results.

Further, in the FIG. 1 example, the identification is included into an information unit to be transmitted, such as a media access control (MAC) frame, to authenticate the source of the information unit. Specifically, the first device 110 includes a processing circuit 120 configured to process outgoing information units and incoming information units. The processing circuit 120 includes any suitable circuits, such as a processor, logic circuits, memory, registers, and the like. In an example, a processor executes software instructions to perform a hash algorithm. In another example, the hash algorithm is implemented by logic circuits.

Further, the processing circuit 120 includes a MAC processing circuit 130 configured to process MAC frames, such as form an outgoing MAC frame, extract fields of an incoming MAC frame, and the like.

In an example, the processing unit 120 generates an identification ID-A based on the public key A, and then the MAC processing circuit 130 form an MAC frame 115 to include the identification ID-A into a specific field, such as an address field in the MAC header of the MAC frame 115. The MAC frame 115 can be further processed by other circuit of the processing circuit 120 and can be transmitted by a transmitting circuit and an antenna as electromagnetic waves in the air.

Further, the first device 110 receives incoming information units and processes the incoming information units. In an example, a receiving circuit and an antenna construct an incoming MAC frame in response to electromagnetic waves in the air. The MAC processing circuit 130 examines the specific field in the MAC header of the MAC frame. Based on the value at the specific field, the first device 110 determines whether the incoming MAC frame is from the second device 150. For example, when the value at the specific field matches an entry of an internal database of the first device 110 that corresponds to the second device 150, the first device 110 authenticates that the incoming MAC frame is formed by the second device 150 and further processes the MAC frame accordingly. When the first device 110 does not recognize the value at the specific field of the incoming MAC frame, the MAC frame is dropped in an example.

Similarly, the second device 150 includes a processing circuit 160 configured to process outgoing information and incoming information. The processing circuit 160 also utilizes certain components that are identical or equivalent to those used in the processing circuit 110; the description of these components has been provided above and will be omitted here for clarity purposes.

It is noted that, in an example, the first device 110 and the second device 150 are acquainted devices. For example, the first device 110 has an entry in its internal database holding an identification for the second device 150, and the second device 150 has an entry in its internal database holding an identification for the first device 110. The first device 110 and the second device 150 can get acquainted by any suitable technique, such as via a central management technique, via peer-to-peer communication, and the like.

According to an embodiment of the disclosure, an information unit, such as the MAC frame 115, the MAC frame 155 can be a multicast frame or a broadcast frame. In an example, a multicast group shares, for example, an asymmetric key pair. The public key of the shared asymmetric key pair can be used to generate an identification for the multicast group. The identification can be included in a field of a MAC frame, such as an address field of the MAC frame to identify the multicast group as the receiving group of the MAC frame.

According to an embodiment of the disclosure, multiple identifications can be generated to avoid collisions. In an example, due to the reduced number of bits in an identification, collisions may happen. In an example, the first device 110 generates multiple identifications based on the same public key A. When a collision is detected for one identification, another identification can be used.

According to an aspect of the disclosure, the public key based identification technique can be suitably modified to provide privacy protection. In an example, the first device 110 uses a hash algorithm having a parameter varying with time to generate the identification ID-A based on the public key A. Thus, the identification ID-A varies with time. Because the first device 110 and the second device 150 are acquainted devices, the second device 150 can still recognize the first device 110 based on the identification ID-A in incoming MAC frames. However, a third party 199, which can be a malicious party, is not able to track the first device 110 for example, by monitoring identifications.

According to another aspect of the disclosure, the public key based identification can be used in a network access control application. In an example, the second device 150 is an access point connected to a network 101. The network 101 includes a server 102 for access control. The second device 150 then performs authentication of the first device 110 based on the public key based identification. When the first device 110 is identified, the public key of the first device 110 is provided to the server 102 for access control. Thus, in an example, the network 101 does not require a secure server for holding secretes.

According to another aspect of the disclosure, the public key based identification can be used in a service discovery application. In an example, the body portion of the MAC frame 115 includes a query of a specific service that the first device 110 looks for. In another example, the body portion of the MAC frame 115 includes one or more services that the first device 110 provides.

Figure 2:
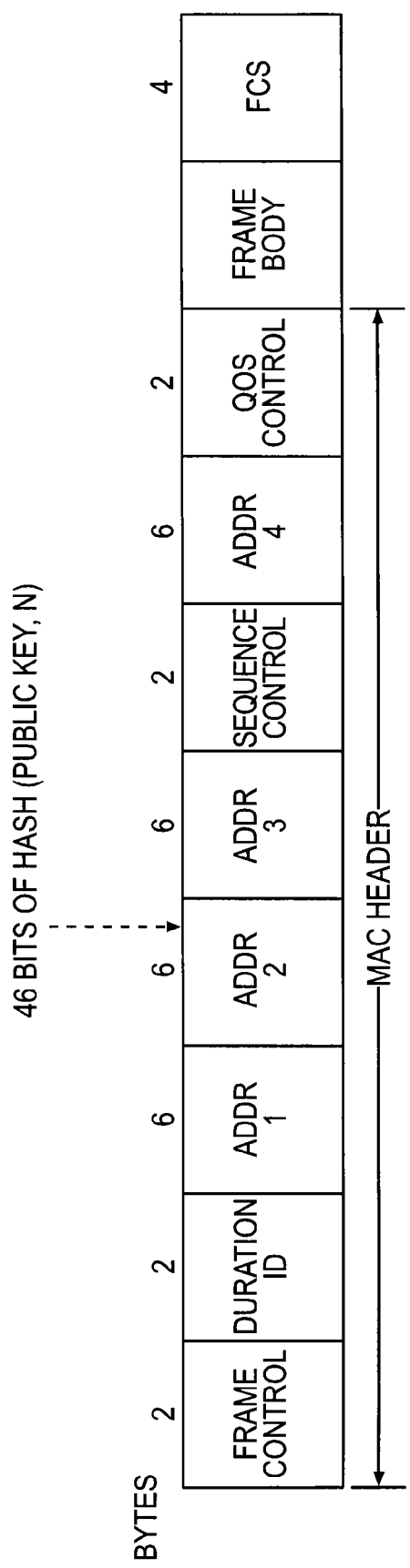
FIG. 2 shows an example of a media access control (MAC) frame according to an embodiment of the disclosure.

FIG. 2 shows an example of a media access control (MAC) frame according to an embodiment of the disclosure. The MAC frame includes several portions, such as a MAC header, a frame body, and a frame check sequence (FCS). The MAC header includes various fields, such as a frame control field, a duration identification (ID) field, four address fields (ADDR1, ADDR2, ADDR3 and ADDR4), a sequence control field, and a quality of service (QOS) field.

According to an embodiment of the disclosure, one of the address fields holds a public key based identification. In an example, a hash function is used to generate an identification of 46 bits based on a public key. The hash function can include other suitable parameters, such as a parameter N. In an example, N is a nonce that is randomly or pseudo randomly generated. In another example, N is a sequence number. The 46 bits of identification and two other bits are then stored in, for example the ADDR2 field that includes a total of 6 bytes (48 bits).

According to an aspect of the disclosure, in a multicast or a broadcast application, one of the address fields can hold an identification for a multicast group or a broadcast group. The identification can be generated based on a public key of a shared asymmetric key pair of the multicast group in an example.

According to another aspect of the disclosure, in a service discovery application, the frame body includes a query of a specific service, and/or a specific service that can be provided by the source device of the MAC frame.

Figure 3:
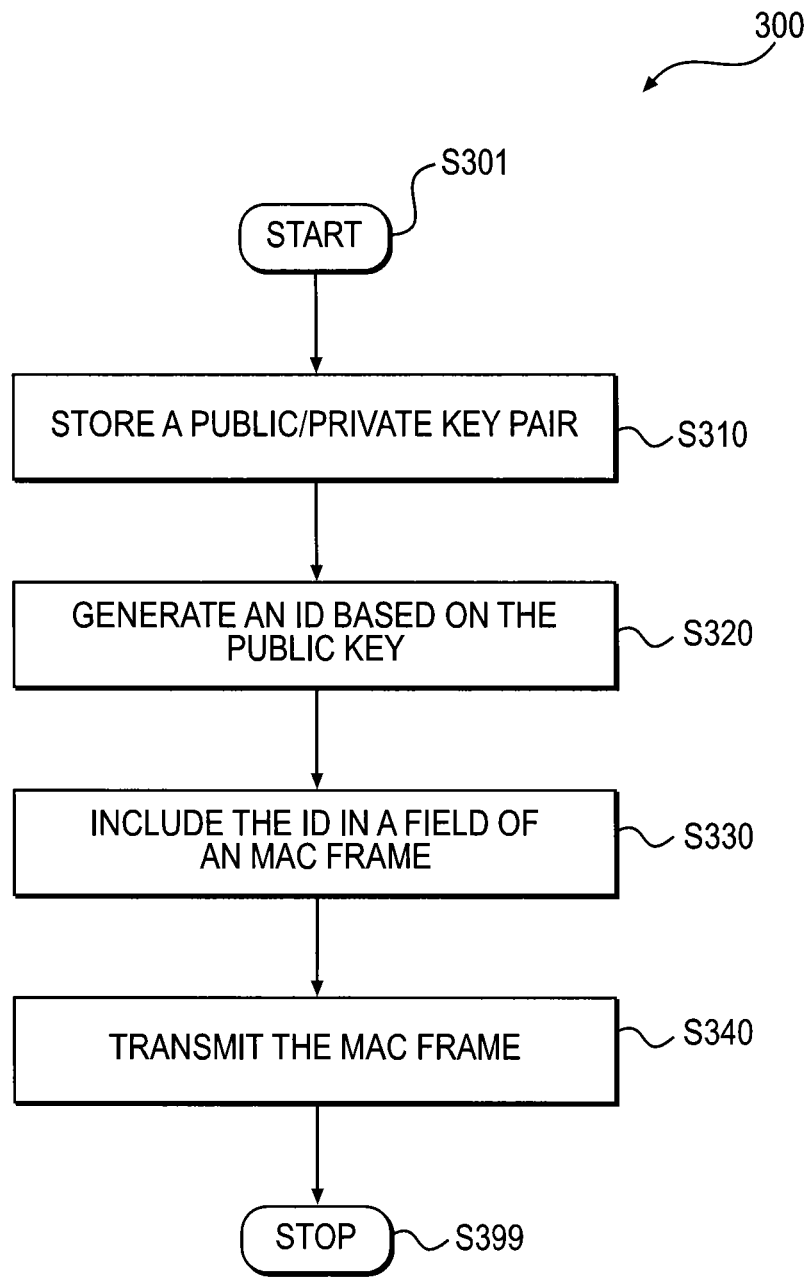
FIG. 3 shows a flow chart outlining a process example 300 according to an embodiment of the disclosure.

FIG. 3 shows a flow chart outlining a process example 300 according to an embodiment of the disclosure. The process 300 is performed by a device, such as the first device 110 to form and transmit an MAC frame, such as the MAC frame 115. The process starts at S301 and proceeds to S310.

At S310, the first device 110 stores the asymmetric key pair 111 including the public key A and the private key A. The private key A is stored in a secure manner, and the public key A can be distribute publically. The asymmetric key pair 111 is used in public key cryptography. In addition, because each public key includes a relatively large number of bits, such as in the range of 120 to 160 bits, that are randomly or pseudo randomly generated, and the public key is generally considered to be unique, and can be used for identification purpose.

At S320, the first device 110 generates an identification ID-A based on the public key A. In an example, the processing circuit 120 truncates the public key A to generate the ID-A. In another example, the processing circuit 120 executes a hash algorithm to generate the ID-A. The ID-A has a reduced number of bits compared to the public key. In an example, the ID-A has 46 bits. The reduced number of bits can simplify ID-A processing.

At S330, the first device 110 includes the identification ID-A into a field of an MAC frame. In an example, the MAC processing circuit 130 forms the MAC frame 115 and includes the ID-A into an address field in the MAC header of the MAC frame 115.

At S340, the first device 110 transmits the MAC frame. For example, the first device 110 includes a transmitting circuit (not shown) and an antenna (not shown). The transmitting circuit and the antenna transmit the MAC frame 115 as electromagnetic waves in the air. Then, the process proceeds to S399 and terminates.

Figure 4:
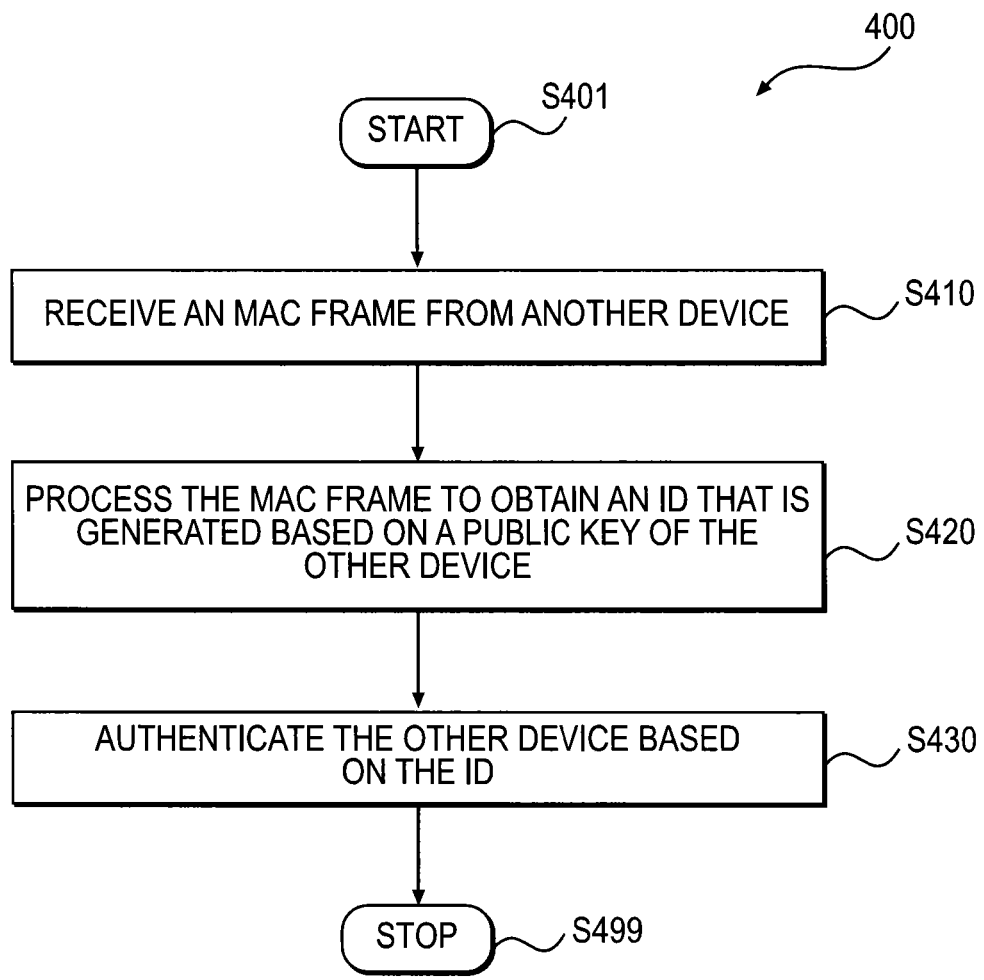
FIG. 4 shows a flow chart outlining a process example 400 according to an embodiment of the disclosure.

FIG. 4 shows a flow chart outlining a process example 400 according to an embodiment of the disclosure. The process 400 is performed by a device, such as the second device 150 to receive an MAC frame. The process starts at S401 and proceeds to S410.

At S410, the second device 150 receives an MAC frame from another device. In an example, the second device 150 includes an antenna (not shown), and a receiving circuit (not shown). The antenna and the receiving circuit reconstruct the MAC frame 115 transmitted by the first device 110 in response to the electromagnetic waves in the air.

At S420, the second device 150 processes the MAC frame to obtain an identification that is generated based on a public key of the other device. In an example, the MAC processing circuit 170 processes the MAC frame, and extracts a value in an address field of the MAC frame.

At S430, the second device 150 authenticates the other device based on the identification. In an example, the first device 110 and the second device 150 are acquainted devices. The second device 150 keeps information, such as identification ID-A, public key A, and the like, of the first device 110 in an entry within an internal database. The second device 150 looks up the extracted value in the internal database. When the extracted value corresponds to the entry of the first device 110, the second device 150 determines that the first device 110 is the source device of the received MAC frame, and processes the received MAC frame accordingly.

However, when the extracted value does not correspond to any entry of the internal database, in an embodiment, a new entry in the internal database is created to learn more information about the source of the MAC frame. In another embodiment, the MAC frame is dropped for processing when the source of the MAC frame is not identified. Then, the process proceeds to S499 and terminates.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method comprising:
generating an identification based on a public key of an asymmetric key pair for a first device by using a hash function with a variable parameter that varies over time;
varying a value of the parameter;
performing the hash function on the public key with the varied parameter to generate another identification;
including the identification into information unit to identify the first device as a source of the information unit;
including a specific service that the first device is requesting or providing in the information unit;
transmitting the information unit from the first device;
receiving the information unit at a second device;
authenticating the first device based on the identification included in the received information unit; and
generating another identification based on the public key for the device when a collision of the identification is detected.

2. The method of claim 1, wherein generating the identification based on the public key of the asymmetric key pair for the device further comprises at least one of:

truncating the public key to generate the identification; and
hashing the public key to generate the identification.

3. The method of claim 1, wherein including the identification into the information unit as the source of the information unit further comprises:
including the identification into a media access control (MAC) frame to identify the device as the source of the MAC frame.

4. The method of claim 3, wherein including the identification into the MAC frame to identify the device as the source of the MAC frame further comprises:
including the identification into an address field in the MAC frame.

5. The method of claim 1, wherein including the identification into the information unit to identify the device as the source of the information unit comprises:
including the identification as an address in a protocol.

6. The method of claim 5, wherein including the identification as address in the protocol further comprises:
including a truncated version of the identification as the address.

7. The method of claim 6, wherein including the truncated version of the identification as the address further comprises:
including the truncated version of the identification as a 802.11 local address.

8. An apparatus, comprising:
a storage medium configured to store an asymmetric key pair; and
a processing circuit configured to generate an identification based on a public key of the asymmetric key pair by using a hash function with a variable parameter that varies over time, vary a value of the parameter to perform the hash function on the public key with the varied parameter to generate another identification, include the identification into information unit to identify the apparatus as a source of the information unit, and include a specific service that the first device is requesting or providing in the information unit; and
a transmitting circuit configured to transmit the information unit, so that a second apparatus can authenticate the apparatus based on the identification included in the transmitted information unit,
wherein the processing circuit is configured to generate another identification based on the public key when a collision of the identification is detected.

9. The apparatus of claim 8, wherein the processing circuit is configured to generate the identification by at least one of truncating the public key to generate the identification, and hashing the public key to generate the identification.

10. The apparatus of claim 8, wherein the processing circuit is configured to include the identification into a media access control (MAC) frame.

11. The apparatus of claim 10, wherein the processing circuit is configured to include the identification into an address field in the MAC frame.

12. The apparatus of claim 8, wherein the processing circuit is configured to include the identification as an address in a protocol.

13. The apparatus of claim 12, wherein the processing circuit is configured to include a truncated version of the identification as the address.

14. The apparatus of claim 13, wherein the processing circuit is configured to include the truncated version of the identification as an 802.11 local address.

* * * * *